United States Patent [19]

Nickles

[11] Patent Number: 5,586,515
[45] Date of Patent: Dec. 24, 1996

[54] FISHING ROD STORAGE APPARATUS AND METHOD

[76] Inventor: James A. Nickles, 1400 Kerr Station Rd., Cabot, Ark. 72023

[21] Appl. No.: 526,598

[22] Filed: Sep. 11, 1995

[51] Int. Cl.⁶ .................................................. B63B 35/14
[52] U.S. Cl. .......................................... 114/255; 114/343
[58] Field of Search .................................... 114/343, 364, 114/255; 43/21.2, 54.1, 17, 27.4; 248/511, 512, 513, 538, 530, 533; 224/209, 210, 213, 230, 235, 259, 261, 920, 922

[56] References Cited

U.S. PATENT DOCUMENTS

| | | |
|---|---|---|
| 3,628,759 | 12/1971 | Knedlik . |
| 4,006,825 | 8/1977 | Austin et al. . |
| 4,109,796 | 8/1978 | Mitchell . |
| 4,157,803 | 6/1979 | Mack . |
| 4,170,801 | 10/1979 | Ward . |
| 4,209,098 | 6/1980 | Adams . |
| 4,234,154 | 11/1980 | Walters et al. . |
| 4,311,262 | 1/1982 | Morin . |
| 4,335,840 | 6/1982 | Williams . |
| 4,485,579 | 12/1984 | Hawie . |
| 4,823,723 | 4/1989 | Brooks ...................................... 114/364 |
| 4,858,366 | 8/1989 | Rushton . |
| 4,869,195 | 9/1989 | Eichfeld . |
| 4,878,311 | 11/1989 | Cano . |
| 4,897,952 | 2/1990 | Hawie . |
| 4,974,537 | 12/1990 | Martin . |
| 5,033,223 | 7/1991 | Minter . |
| 5,142,809 | 9/1992 | O'Brien et al. . |
| 5,152,494 | 10/1992 | Frunzar . |
| 5,275,316 | 1/1994 | Kish . |
| 5,340,135 | 8/1994 | Womberly . |
| 5,383,299 | 1/1995 | Smelker . |

OTHER PUBLICATIONS

1995 Catalog for Skeeter Performance Fishing Boats.
Bass Pro Shops 1994 Catalog, pp. 267 and 280.
Cabela's 1995 Spring Catalog, p. 99.

*Primary Examiner*—Stephen Avila
*Attorney, Agent, or Firm*—Ray F. Cox, Jr.

[57] ABSTRACT

A fishing rod storage apparatus and method are disclosed in which the fishing rod storage device comprises a base and a plurality of tubes affixed to the base for receiving tip ends of a plurality of rods to store and support the rods while reducing risks of tangling or damage to rod tips, fishing lines, and lures. The device may be affixed to a rod box of a boat to facilitate quick, tangle-free storage and retrieval of several rods.

2 Claims, 2 Drawing Sheets

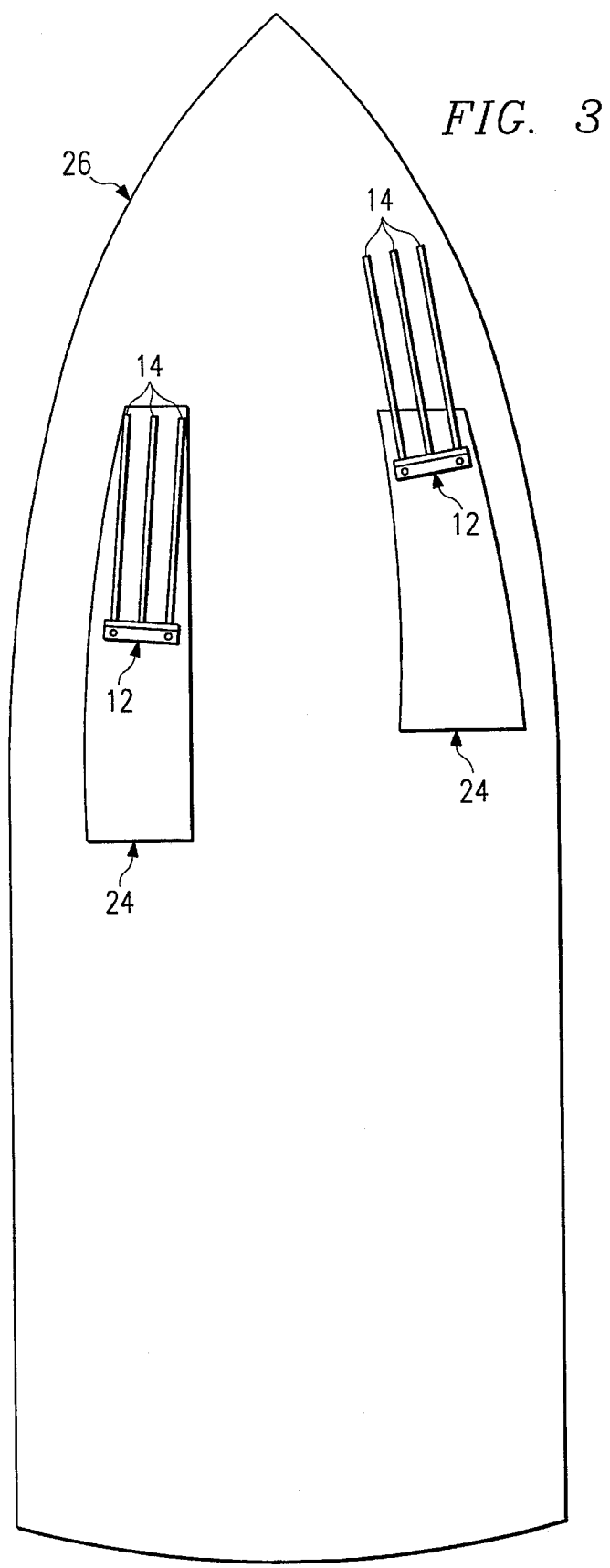

4,586,515

FISHING ROD STORAGE APPARATUS AND METHOD

BACKGROUND OF THE INVENTION

This invention relates to an apparatus and method for storing fishing rods and more particularly to an apparatus and method for storing fishing rods within a rod box of a boat.

Boat manufacturers typically equip fishing boats with rod boxes or similar lockers or storage devices for storing fishing rods while they are not in use. These rod boxes typically consist of two sides, a bottom and a lid or door to gain access to the storage area. Front ends of these rod boxes are typically not enclosed but are left open to unused space below a deck of the boat. Such rod boxes provide a convenient place to store rods when the rods are not in use and to protect the rods from such things as the elements and foot traffic on a boat deck. These rod boxes are not, however, without problems. For example, rod boxes are typically hollow, and when rods are laid loose in the bottom of a rod box, the rod tips, guides, the fishing lines and lures are prone to become entangled. It becomes more difficult to untangle and retrieve rods as more rods are placed in the rod box, and the danger of damaging rod tips, fishing lines or lures also increases as more rods are placed in the rod box.

A variety of fishing rod racks, holders, storage and carrying devices are well known in the art, but these devices suffer from various shortcomings and have not satisfactorily addressed problems associated with storing rods in a rod box. These devices typically use straps and clips of various construction and rely on two points of contact with a rod to restrain movement of the rod. Alternatively, some rely on various ways of receiving and restraining or supporting a handle end of a rod. These devices offer some advantages but suffer from a number of shortcomings. For example, the two part restraints typically do not offer tip protection, and the clips or restraints are often constructed of foam rubber or similar materials that are prone to breakage, damage or deterioration at unacceptable rates. Securing and retrieving a rod from such racks can also be relatively complex and time consuming, which is particularly unacceptable in tournament fishing situations in which fishing time is precious and in which seconds can make the difference between winning and losing a tournament. Further, such devices are typically not designed for use in rod boxes and would unduly limit the number of rods that could be stored within a rod box.

SUMMARY OF THE INVENTION

It is therefore an object of the present invention to provide an apparatus and method for conveniently and efficiently storing fishing rods.

It is a further object of the present invention to provide an apparatus and method of the above type for conveniently and efficiently storing fishing rods in a rod box.

It is a further object of the present invention to provide an apparatus and method of the above type which permits quick, easy, tangle-free placement and retrieval of rods in and from a rod box.

It is a still further object of the present invention to provide an apparatus and method of the above type which provides for protection of rod tips, fishing lines and lures.

It is a still further object of the present invention to provide an apparatus and method of the above type of simple, rugged and long-lasting construction.

It is a further object of the present invention to provide an apparatus and method of the above type in which the device can be conveniently molded into boats being manufactured or can be quickly and easily installed into existing boats by owners or dealers.

Toward the fulfillment of these and other objects, the present invention features a rod storage device which compromises a base and a plurality of tubes affixed to the base for receiving tip ends of a plurality of rods to support the rods while reducing risks of tangling or injury to rod tips, fishing lines and lures. The device may be affixed to a rod box of a boat to facilitate quick, tangle-free storage and retrieval of several rods, equipped with reels, lines and lures.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment of the present invention when taken in conjunction with the accompanying drawings wherein:

FIG. 3 is a schematic overhead view of a boat having rod boxes incorporating features of the present invention.

DESCRIPTION OF THE PREFERRED EMBODIMENT

Figure 1:
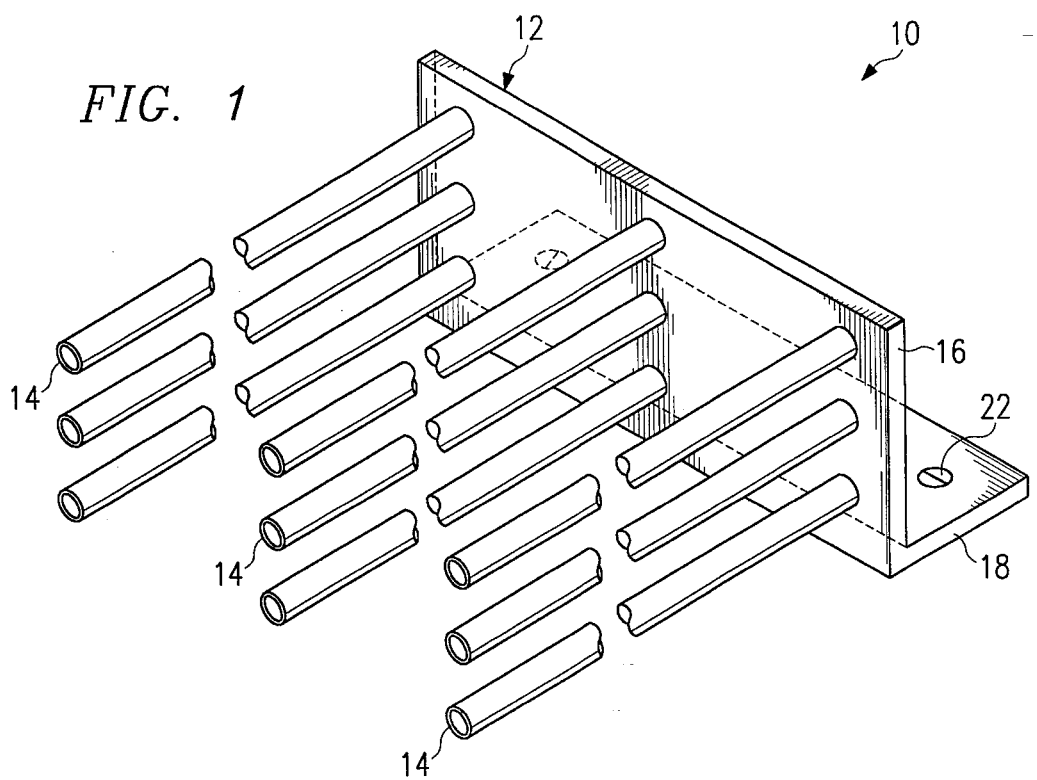
FIG. 1 is a perspective view of a device of the present invention.

Referring to FIG. 1, the reference 10 refers in general to a fishing rod storage device incorporating the teachings of the present invention. The device 10 includes a base 12 and a plurality of tubes 14.

Figure 2:
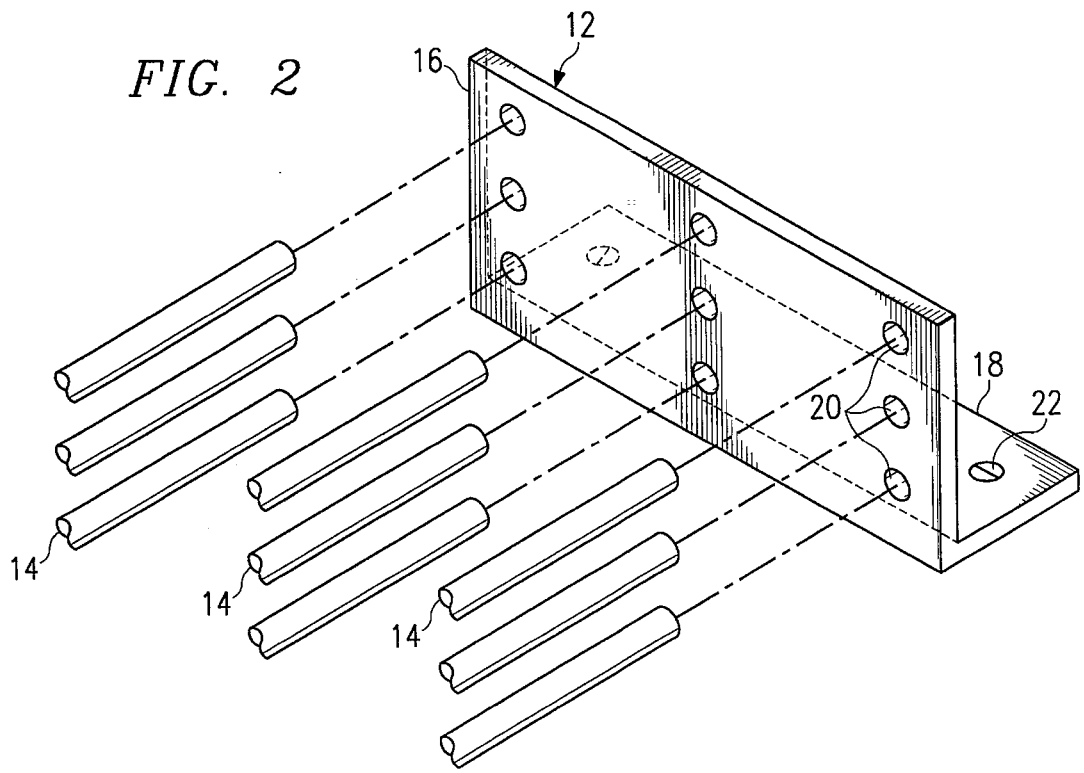
FIG. 2 is a perspective view of the device of FIG. 1 with tubes removed from a base.

As best seen in FIG. 2, the base 12 has an upper, substantially vertical portion 16 and a lower portion 18 disposed substantially perpendicular to the upper portion 16. Holes 20 pass through the upper portion 16 of the base 12 for receiving and retaining the tubes 14. Holes 22 pass through the lower portion 18 of the base 12 to provide for convenient attachment of the device 10 to a rod box of a boat. Although not shown in the drawings, additional flanges similar to lower portion 18 may be provided along multiple edges of upper portion 16 to provide more flexibility in mounting the base 12 within a rod box 24. For example, flanges or portions similar to lower portion 18 could be provided along upper, lower and a side edge of upper portion 16, each flange having a plurality of holes for use in mounting the base 12 within a rod box 24. The holes 20 are arranged in substantially horizontal rows.

Although the base is depicted as being substantially sheet-like and is described as having a plurality of holes 20 and 22 passing there through, it is understood that the base may take any number of shapes and may be affixed to the tubes 14 and may secure the tubes 14 within a rod box in any number of ways. For example edges of the base may be rounded or angled to permit the base 12 to be secured within rod boxes 24 with irregular shapes. The base is preferably formed from aluminum, but it is understood that the base 12 may be formed from any number of materials, including but not limited to various plastics, metals, fiberglass, and wood and is preferably water resistant.

The tubes 14 serve as a sheath or shield by providing an individual storage space for each rod tip. The tubes 14 define passage ways for receiving, storing and protecting tip ends of fishing rods, and the tubes are sized to provide an open cross-section area capable of accepting a tip end of a fishing rod, its line guides, line and fishing lure without causing damage to these things. In the preferred embodiment, each of the tubes 14 is cylindrical, having a substantially circular cross-section with an inside diameter preferably within a range of approximately 1" to 2" and more preferably within a range of approximately 1⅛" to 1½".

Each of the tubes 14 is of sufficient length to provide for storage of several fishing rods, the rods being equipped with reels, lines and lures, in close proximity while preventing entanglement of rod tip ends, fishing lines and lures and is of sufficient length to provide protection for rod tip ends. The tubes are preferably of a length within a range of approximately 18" to 48" and are more preferably within a range of approximately 34" to 42".

The tubes 14 preferably have open ends to permit air flow and to encourage drying of wet rods, lines and lures. In an alternate embodiment, a front end of each tube 14 is partially obstructed to prevent a rod tip end from passing beyond the front end of the tube while still permitting air flow through the tube 14.

In one embodiment, each tube 14 is attached to the base 12 by inserting a front end of the tube through a hole 20 in the base 12 from the rear side of the base 12. The tube 14 is slid forwardly through the hole 20 to the desired position. In that regard, each tube 14 may be flared on its rear end portion to limit the length of the tube 14 which may be inserted through the hole 20 and to help retain the tube 14 within the hole 20. In the preferred embodiment, substantially the entire length of each tube extends forwardly from the front side of the base 12 and is secured to the base 12 at a rear end portion of the tube 14. The tubes 14 may be secured or affixed to the base 12 in any number of ways and at any number of locations along the lengths of the tubes 14.

The tubes 14 are preferably formed from pvc, but it is understood that the tubes 14 may be formed from any number of materials, including but not limited to various other plastics, metals, fiberglass, and wood and is preferably water resistant.

As best shown in FIG. 3, the lower portion 18 of the base 12 is aligned within a rod box 24 of a boat 26 and is affixed thereto using any suitable means, including but not limited to bolting, screwing, riveting, gluing or welding. The device 10 is aligned in the rod box 24 so that the rear side of the base 12 and rear end portions of the tubes 14 face the rear of the rod box 24 and so that the tubes 14 extend substantially horizontally along the length of the rod box 24 toward the front of the rod box 24. The base is disposed substantially perpendicular to the length of the rod box 24 and is positioned along the length of the rod box so that when a tip end of a rod is slid through a tube 14 and a handle end of the rod is placed on the rod box 24 floor a short distance, such as approximately 3 inches, from the rear of the rod box 24, the tip end of the rod is near but does not extend beyond the front end portion of the tube 14. The desired placement of the base measured from the rear end of the rod box 24 may be calculated by taking the length of the rod box 24, subtracting 3 inches or another desired rear clearance spacing, adding the length of a tube 14 and subtracting the length of the longest rod and reel combination you anticipate storing in the rod box 24. As illustrated in FIG. 3, because front ends of rod boxes 24 are typically not enclosed, the tubes 14 may extend beyond the front end of the rod box 24, into unused space under the deck of the boat 26.

In operation, a fishing rod, equipped with a reel, line and lure, is placed in a rod box 24 by sliding the tip end of the rod through a tube 14 until the handle end of the rod clears the rear end of the rod box 24. The handle and reel are then laid upon the floor of the rod box 24. The tip end of the rod should approach but not extend past the front end of the tube 14. This process is repeated for the desired number of fishing rods, with each fishing rod being placed in a separate tube 14. When a particular rod is needed, the fishermen grasps the handle end of the rod, lifts the handle end to clear the rod box 24 and slides the rod rearwardly to remove the tip end of the rod from the tube and to remove the rod from the rod box 24.

The time savings associated with using the present device can be particularly significant in tournament fishing or in other situations in which a fisherman may want to have several fishing rods rigged with different lures and stored for quick changes while fishing. Using the device 10 of the present invention, the fisherman may make quick, easy changes between different rods, storing a rod after use and selecting and removing desired rods for additional use with a minimum of time and hassle. The tubes 14 prevent entanglement of tip ends, lines and lures, and protect the covered portions of the rods. The open ends of the tubes 14 permit quick drying of wet equipment.

It is understood that variations may be made in the apparatus and method of the present invention without departing from the scope of the invention. For example, although the device is described with a single base 12, any number of bases or supports may be used and may be disposed in any number of locations along the length of the tubes 14. Further, although the device is described with particular emphasis on its use within a rod box 24 of a boat 26, it is understood that the device 10 need not be affixed within a rod box 24. Also, although the base 12 and tubes 14 are described separately, they may be integrally formed.

Other modifications, changes and substitutions are intended in the forgoing disclosure and, in some instances, some features of the invention may be employed without a corresponding use of other features. Various modifications of the disclosed embodiment as well as alternative applications of the invention will be suggested to persons skilled in the art by the foregoing specification and drawings. Accordingly, it is appropriate that the appended claims be construed broadly and in a manner consistent with the scope of the invention therein.

What is claimed is:

1. A fishing rod storage device comprising:

a base having an upper, substantially planar portion disposed substantially vertically and a lower, substantially planar portion disposed substantially perpendicular thereto, said upper portion of said base having a first plurality of holes passing therethrough and said lower portion of said base having a second plurality of holes passing therethrough to facilitate securing said device within a rod box;

a plurality of tubes secured to said upper portion of said base and aligned with said first plurality of holes so that said base retains and aligns said tubes substantially horizontally, each of said first plurality of holes and each of said plurality of tubes being sized to permit a tip end of a fishing rod to pass therethrough; and each of said plurality of tubes being of sufficient length to store a fishing rod in close proximity to other fishing rods while preventing entanglement of rod tip ends, fishing lines and lures; and wherein each of said plurality of tubes has a rear end portion and wherein each of said plurality of tubes is secured to said base at said rear end portion of said tube whereby substantially the entire length of each of said plurality of tubes extends forward of said base.

2. A fishing boat comprising;

a boat;

a rod box disposed within said boat; and a fishing rod storage device comprising;

a base secured to said rod box; and a plurality of tubes secured to said base, said plurality of tubes extending substantially horizontal at least partially within said rod box and being disposed to receive tip ends of a plurality of fishing rods;

wherein each of said plurality of tubes has a rear end portion and wherein each of said plurality of tubes is secured to said base at said rear end portion whereby substantially the entire length of each of said plurality of tubes extends forward of said base.

* * * * *